United States Patent [19]
Hornle et al.

[11] 3,958,929
[45] May 25, 1976

[54] DYESTUFF PREPARATIONS

[75] Inventors: Reinhold Hornle, Cologne;
Hans-Heinz Molls; Roland Rupp,
both of Leverkusen; Robert Kuth,
Cologne, all of Germany

[73] Assignee: Bayer Aktiengesellschaft,
Leverkusen, Germany

[22] Filed: Feb. 8, 1974

[21] Appl. No.: 440,662

[30] Foreign Application Priority Data
Feb. 10, 1973 Germany............................ 2306612

[52] U.S. Cl.................................. 8/79; 264/109;
252/301.22
[51] Int. Cl.².......................................... C09B 67/00
[58] Field of Search.................. 8/79; 252/301.2 W;
264/109

[56] References Cited
UNITED STATES PATENTS

| | | | |
|---|---|---|---|
| 3,639,168 | 2/1972 | Monti et al. | 8/79 |
| 3,645,665 | 2/1972 | Etters | 8/79 |

Primary Examiner—Melvyn I. Marquis
Attorney, Agent, or Firm—Plumley & Tyner

[57] ABSTRACT

Pressing of uniform shape and uniform weight of disperse dyestuffs and optical brightening agents with a solubility in water less than 0.5% at 20°C which are suitable for an automate metering step and which disintegrate in aqueous dye baths to give dispersions are manufactured by compressing the dyestuff or brightening agent, an anionic dispersing agent and a solid water-soluble mould release agent which gives a neutral to weakly alkaline reaction in water.

5 Claims, No Drawings

DYESTUFF PREPARATIONS

The invention relates to preparations of dispersion dyestuffs and sparingly water-soluble optical brighteners in the form of pressings of uniform shape and uniform weight, their preparation and their use for dyeing organic materials.

There is a long-standing need to simplify and automate the metering steps which are necessary prior to dyeing organic materials. This applies, in particular, also to continuous dyeing processes which demand a constant concentration of a dyestuff in a substrate. The previously customary commercially available forms of dyestuffs, powders, granules, solutions or dispersions do not fully satisfy this requirement since either exact automatic metering is not possible, or other disadvantages are entailed.

Powders and granules do not readily lend themselves to automatic metering; furthermore, powders are not dust-free and this is a further, serious disadvantage. Solutions and dispersions occupy large volumes, which makes despatch, storage and handling more expensive. Where organic solvents are concerned, there are additional problems of inflammability, explosiveness and toxicity, whilst dispersions have the disadvantage that they tend to be unstable and hence have an unfavourable influence on exact metering.

In order to avoid the disadvantages mentioned it has already been proposed at various times to use dyestuffs in the form of pressings or tablets. Dyestuff tablets produce little dust, can readily be metered automatically and can be transported and stored in a space-saving manner. The dyestuffs tablets used hitherto without exception contained soluble dyestuffs. The only additional requirement these tablets had to meet was that the tablets should dissolve rapidly in the solvent. It is not possible to apply the information gained from such tablets to the preparation of dyestuff tablets with disperse dyestuff since here what matters when using the dyeing tablet for dyeing is not to dissolve the dyestuff but to convert it into a finely divided form. It had to be assumed that under the action of high pressures used to prepare pressings the sparingly water-soluble dyestuff present in a finely divided form agglomerates so that when the pressing is used the dyestuff does not revert to a finely disperse state of division.

Hence, the present invention relates to pressings of uniform shape and uniform weight containing a disperse dyestuff or an optical brightener with a solubility in water less than 0.5% at 20°C, an anionic dispersing agent and a solid water-soluble mould release agent which gives a neutral to weakly alkaline up to pH 9 reaction in water.

Surprisingly, such preparations disintegrate in aqueous dye baths to give dyestuff dispersions in which the dyestuff has the finely disperse state of division necessary for dyeing.

The disperse dyestuffs, which can belong to the most diverse categories, for example to the azo, anthraquinone, perinone, nitro, styryl, azomethine or triphenylmethane series, are in each case known and commercially available. Some trademarks are mentioned in H. Rath, Lehrbuch der Textilchemie ("Textbook of Textile Chemistry"), Springer-Verlag, 2nd. edition, page 542 (1963). Individual disperse dyestuffs, in addition to those in the illustrative embodiments which follow, are to be found in the Colour Index, 3rd. addition, volume 2, pages 2,479 to 2,742 and in the relevant patent literature, for example in German Patent Specifications Nos. 1,165,789, 1,200,061, 1,290,915, 946,974, 1,180,760, 1,644,587, 1,009,595, 1,167,615, 1,029,506, 1,222,188, 1,144,678, 1,083,456, 953,548, 927,944, 1,276,843, 1,257,314, 1,644,578, 455,639, 1,080,064, 1,245,005, 1,098,125, 1,469,770, 1,172,387, 1,172,388, 1,569,728, 1,154,894, 928,902, 1,284,543, 1,173,602, 1,444,644, 942,221, 1,243,803, 1,278,637, 1,239,421, 1,127,864, 1,229,663, 1,040,499, 1,005,926, 542,803, 1,288,067, 435,478, 1,260,654, 1,544,484, 1,419,811, 1,223,797, 1,218,090, 1,257,313, 1,100,208, 1,218,090, 1,164,971, 1,164,972, 1,040,499, 1,105,837 and 1,011,397, in German Offenlegungsschriften (German Published Specifications) Nos. 1,769,789, 1,644,598, 1,644,593, 1,619,536, 2,030,507 and 2,044,620 and in U.S. Patent Specifications Nos. 2,051,005, 2,072,252, 3,265,460 and 2,255,045.

The sparingly water-soluble optical brighteners can belong to the most diverse categories, for example the 1,3-diarylpyrazoline, 3-aryl- and 3-hetaryl-carbostyrile, styrylbenzoxazole, 3-aryl- and 3-hetaryl-coumarin, 1-triazinylpyrene, tetrahydrothionaphthene, bis-benzoxazolylthiophene, bis-benzimidazolylethylene, bis-benzoxazolylstilbene and bis-triazinylstilbene series. The brighteners are known and are to be found in the following patent specifications: German Patent Specifications Nos. 1,080,963, 1,166,197, 1,226,583, 883,286 and 841,752, German Offenlegungschrift (German Published Specification) No. 1,953,809, Belgian Patent Specification No. 625,678, Austrian Patent Specification No. 260,924, French Patent Specifications Nos. 1,397,629 and 1,453,061, British Patent Specifications Nos. 883,826, 1,087,375, 1,103,531 and 1,141,454, Swiss Patent Specifications Nos. 415,535 and 472,416 and U.S. Patent Specifications Nos. 3,260,715 and 3,322,680.

Examples of suitable anionic dispersing agents are substituted or unsubstituted aryl-alkyl-aryl-polysulphonic acids of the type of dinaphthylmethanedisulphonic acid and dihydroxydinaphthyloxyphenylmethanedisulphonic acids, as well as ligninsulphonic acids and vinyl polymers of molecular weight 500 to 1,000,000 possessing groups which confer solubility, especially $-SO_3^-$, $-COO^-$ and heterocyclic structures, amongst the latter especially polyvinylpyrrolidone.

Suitable solid, water-soluble mould release agents which give a neutral to weakly alkaline reaction in water are long-chain aliphatic, cycloaliphatic or aliphatic-aromatic compounds with 6 – 50 C atoms which contain one or more groups which confer solubility in water. The aliphatic, cycloaliphatic or aliphatic-aromatic radicals can be straightchain or branched, saturated or unsaturated, or interrupted by heteroatoms.

Suitable groups which confer solubility in water are $-CO_2^{(-)}$, $-SO_3^{(-)}$, $-SO_2^{(-)}$, $-O-SO_3^{(-)}$, $-OPO_3H_2^{(-)}$, $-O-PO_3H^{(-2)}$ and $-O-PO_3^{(-3)}$ in the form of their alkali metal salts, alkaline earth metal salts or ammonium salts, as well as polyglycol ether radicals.

The preparations can preferably contain 5 – 50% by weight of dyestuff, 40 – 94.5% by weight of dispersing agent and 0.5 – 10% by weight of mould release agent. Preparations containing 20 – 40% of dyestuff, 52 – 79% of dispersing agent and 1 – 8% of mould release agent are particularly preferred.

The preparations can contain further additives such as extenders.

The dyestuff preparations according to the invention can be used in the most diverse dyeing processes in which dyestuffs are used for dyeing from dispersion, for example in bath dyeing with or without carriers, in high temperature dyeing or in the thermosol process. The materials to be dyed can be fibres, filaments, woven fabrics, knitted fabrics, tapes, films or sheets, but above all fibrous materials. Fibrous materials which can be used are those from polyesters, such as polyethylene terephthalate or polycyclohexanedimethylene terephthalate, from cellulose triacetate or cellulose 2½acetate, from synthetic polyamides such as hexamethylenediamine adipate, poly-ω-caprolactam or ε-aminoundecanoic acid, or from polyurethanes, polyacrylonitrile, polyolefines or polycarbonates.

Pressings which consist of disperse dyestuffs or sparingly water-soluble optical brighteners, anionic dispersing agents, water-soluble mould release agents which give a neutral to weakly alkaline reaction in water and, optionally, further additives, takes place according to customary processes used for the preparation of tablets, by compressing the mixtures prepared from the individual components, using pressures of between 700 and 2,000 atmospheres. With regard to the preparation of pressings of the type claimed, reference may be made to the relevant literature, for example "Die Tablette", volume 7 in the series Der Pharmazeutische Betrieb by W. A. Ritschel, Editio Cantor KG/Aulendorf (Wurtt.) 1966.

In order to obtain pressings of constant weight, it has proved desirable to spray-dry an aqueous dispersion of the dyestuffs and dispersing agents to give granules, to mix the dry granules with the mould release agent and to compress the mixture.

The pressings according to the invention are of constant weight, relatively free from dust, stable to abrasion, dimensionally stable, easily dispersible and easily metered by manual or automatic counting.

The weight of these pressings can vary within a sizable range. In general, they weigh from 0.5 to 100 g.

The smaller pressings are preferably in the form of cylindrical or spherical tablets; the larger pressings are preferably used in briquet form.

In relation to the pressing process, the term mould release agents includes the following subsidiary terms: lubricating agents, slip agents, non-adhesion agents, nonstick agents and lubricants. These terms are also used as synonyms in the literature.

EXAMPLE 1

30 parts by weight of the disperse dyestuff of the formula

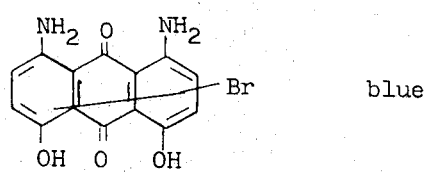 blue and 65 parts by weight of sodium ligninsulphonate in the form of an aqueous slurry of solids content 30% by weight are ground to a particle size of <2.5μ in a stirred mill containing grinding bodies of size 0.25 – 0.3 mm. The dispersion is subjected to a granulation spray drying process at an air input temperature of 180°C and an air exit temperature of 80°C, the spraying equipment consisting of a pressure vortex nozzle of bore 2–3 mm.

95 parts by weight of the sprayed granules of diameter 40 – 200μ are mixed dry with 5 parts by weight of sodium lauryl alcohol-sulphate of approximately the same particle size. The mixture is pressed on a rotating tablet press or eccentric tablet press under pressures of 900 – 1,000 atmospheres gauge to give pressings weighing 1 g, with an average weight deviation of <1 per cent.

The tablets can be dispersed in a 30-fold amount of water at 80°– 90°C within the space of 2 – 3 minutes and the fine state of division which is achieved corresponds to that of the dispersion before spray granulation.

Using customary dyeing processes, the dispersion dyes polyester fibres blue.

EXAMPLE 2

Dyestuff tablets can also be produced with the dyestuffs listed in the table which follows: they dye polyester fibres in the colour shades mentioned:

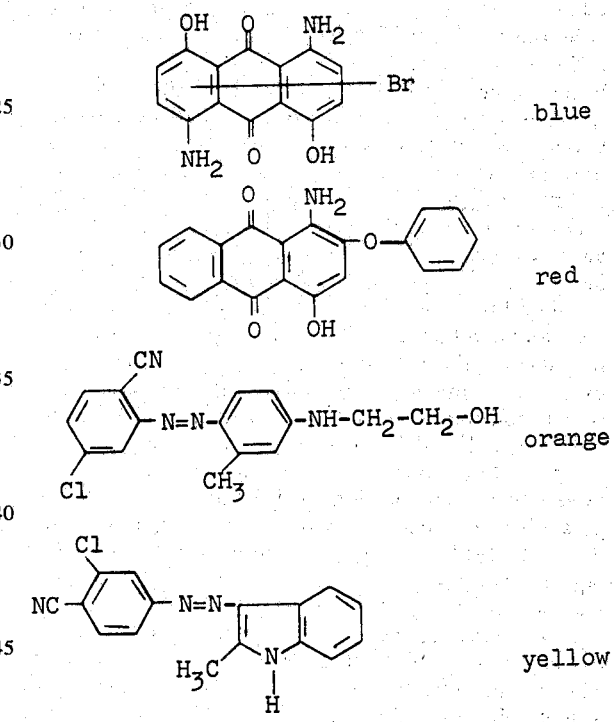

Analogous tablets can be produced in accordance with the instructions of Example 1, using the following optical brighteners which produce a brilliant brightening of cellulose triacetate:

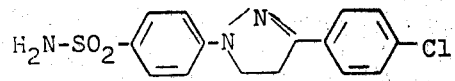

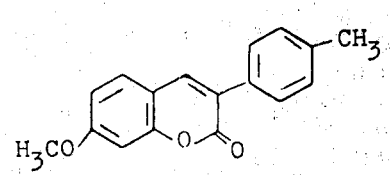

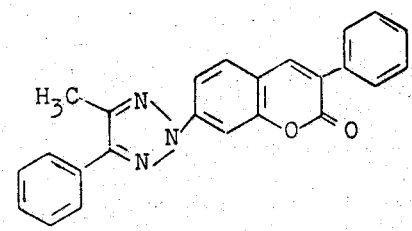

EXAMPLE 3

Tablets in which the ratio of dyestuff:dispersing agent is changed from 30:65 to 10:85 or 45:50 are produced analogously to Examples 1 and 2.

The tablets disperse within the space of 2 to 3 minutes in a 30-fold amount of water at 80°–90°C and give a dyestuff dispersion, the finely divided state of which does not differ from the finely divided state of the dispersion before spray granulation.

EXAMPLE 4

Instead of the dispersing agent mentioned in Example 1, polyvinylpyrrolidone of molecular weight 50,000 and/or the sodium salt of the condensation product of naphthalene-sulphonic acid with formaldehyde or of 2-hydroxynaphthalene-6-sulphonic acid and p-cresol with formaldehyde are used. Tablets of uniform shape and weight are obtained, and their ability to disperse does not differ from that of the tablets obtained according to Example 1.

EXAMPLE 5

The dispersion from Examples 1 to 4, used for spray granulation, is prepared in a ball mill, disc mill or kneader instead of a stirred mill. When using these dispersions for making the tablets, no changes compared to Example 1 are found. The properties of the tablets thus obtained do not differ from the tablets obtained according to Example 1.

Correspondingly, no differences are found if the drying of the dyestuff dispersion, instead of being carried out by spray granulation, is carried out by circulating air drying or vacuum drying on a plate, belt or drum, or in a vacuum paddle drier, the drying process being followed by granulation by compacting on a drum, or in a fluidised bed.

Drying can also successfully be carried out in a fluidised bed after the dyestuff dispersion has been granulated moist by grating the kneaded paste.

EXAMPLE 6

Tablets of identical quality are obtained if in the procedure of Example 1 the proportion of mould release agent is increased to 10 per cent or lowered to 0.5 per cent.

The properties of the tablets do not suffer if instead of sodium lauryl-sulphate one of the following products is employed as the mould release agent in one of the preceding examples: sodium stearate, sodium palmitate, potassium octadecylbenzenesulphonate, sodium oleic-acid-N-methyltauride or the reaction product of 1 mol of oleyl alcohol with 50 mols of ethylene oxide.

EXAMPLE 7

Tablets of identical quality to that described in Example 1 are obtained if the press pressure is reduced to 700 atmospheres gauge or increased to 1,500 atmospheres gauge.

We claim:

1. Pressings of uniform shape and uniform weight containing 5–50% by weight of a disperse dyestuff or an optical brightener with a solubility in water less than 0.5% at 20 C, 40–94.5% by weight of an anionic dispersing agent, and 0.5–10% by weight of a solid water-soluble mold release agent which gives a neutral to weakly alkaline reaction in water.

2. Pressings according to claim 1, characterised in that they contain optionally substituted arylalkylarylpolysulphonic acids as dispersing agents.

3. Pressings according to claim 1, characterised in that they contain long-chain aliphatic, cycloaliphatic or araliphatic compounds with 6 – 50 C atoms, which possess groups which confer solubility in water, as mould release agents.

4. Process for the preparation of pressings according to claim 1, characterised in that the dyestuff or optical brightener together with the dispersing agent is subjected to a wet comminution, the resulting dispersion is sprayed to give dry granules, the granules are mixed with the mould release agent and the mixture is compressed.

5. Pressings according to claim 1 wherein the amount of dyestuff or optical brightener is 20–40%, the amount of the dispersing agent is 52–79%, and the amount of the mold release agent is 1–8%.

* * * * *